US012600219B2

(12) United States Patent  (10) Patent No.:  US 12,600,219 B2
Huang et al.  (45) Date of Patent:  Apr. 14, 2026

(54) INVERTED BATTERY PACK ASSEMBLY

(71) Applicant: GM GLOBAL TECHNOLOGY OPERATIONS LLC, Detroit, MI (US)

(72) Inventors: Lu Huang, Troy, MI (US); Hui-ping Wang, Troy, MI (US); Dohyun Leem, Birmingham, MI (US); Joshua Lee Solomon, Berkley, MI (US); Derek Frei Lahr, Ann Arbor, MI (US); Blair E. Carlson, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 311 days.

(21) Appl. No.: 18/347,128

(22) Filed: Jul. 5, 2023

(65) Prior Publication Data

US 2025/0010699 A1      Jan. 9, 2025

(51) Int. Cl.
B60K 1/04      (2019.01)
B60L 50/60      (2019.01)
B60L 50/64      (2019.01)
H01M 50/209      (2021.01)
H01M 50/249      (2021.01)
H01M 50/264      (2021.01)
H01M 50/271      (2021.01)

(52) U.S. Cl.
CPC ................ B60K 1/04 (2013.01); B60L 50/64 (2019.02); B60L 50/66 (2019.02); H01M 50/209 (2021.01); H01M 50/249 (2021.01); H01M 50/264 (2021.01); H01M 50/271 (2021.01); *B60K 2001/0438* (2013.01); *H01M 2220/20* (2013.01)

(58) Field of Classification Search
CPC ... B60K 1/04; B60K 2001/0438; B60L 50/64; B60L 50/66; H01M 50/249; H01M 50/209; H01M 50/264; H01M 50/271; H01M 2220/20
USPC ........................................................ 180/68.5
See application file for complete search history.

(56) References Cited

U.S. PATENT DOCUMENTS

| | | | | |
|---|---|---|---|---|
| 10,661,647 | B2 * | 5/2020 | Hofer | H01M 50/147 |
| 11,171,385 | B2 * | 11/2021 | Wang | B23K 26/18 |
| 2019/0217695 | A1 * | 7/2019 | Hofer | H01M 50/147 |
| 2020/0176725 | A1 * | 6/2020 | Dai | H01M 50/105 |

(Continued)

FOREIGN PATENT DOCUMENTS

| | | | | |
|---|---|---|---|---|
| DE | 102018211220 A1 | 1/2020 | | |
| DE | 102020114059 A1 * | 12/2021 | .......... | H01M 50/271 |
| DE | 102020133960 A1 | 6/2022 | | |

(Continued)

OTHER PUBLICATIONS

Translation of DE-102020134689-A1 accessed on Jul. 25, 2025 at www.espacenet.com (Year: 2020).*

(Continued)

*Primary Examiner* — James A Shriver, II
*Assistant Examiner* — Hilary L Johns

(57)      ABSTRACT

A rechargeable energy storage system for a vehicle including a bottom shear plate and a side enclosure having a bottom end connected to the bottom shear plate. A top shear plate is connected to a top end of the side enclosure and a plurality of battery cells are suspended from a bottom of the top shear plate by corresponding mating features that secure the plurality of cells to the top shear plate.

14 Claims, 4 Drawing Sheets

(56) References Cited

U.S. PATENT DOCUMENTS

2021/0273279 A1 * 9/2021 Hettenkofer ........ H01M 10/625
2024/0413474 A1 * 12/2024 Coppola .......... H01M 10/6557

FOREIGN PATENT DOCUMENTS

DE      102020133961 A1    6/2022
DE      102020134689 A1 *  6/2022   .............. B60K 1/04

OTHER PUBLICATIONS

Su, Qili et al, U.S. Appl. No. 17/886,579, filed Aug. 12, 2022 entitled "High Voltage Battery Including Tab-Free And Weld-Free Folded Bipolar Solid-State Batteries," 51 pages.
Huang, Lu et al, U.S. Appl. No. 18/168,737, filed Feb. 17, 2023 entitled "Battery Pack Including Horizontal Cell Stack Structure," 30 pages.
Office Action dated Feb. 27, 2024 from German Patent Office for German Patent No. 10 2023 127 373.6; 8pgs.

* cited by examiner

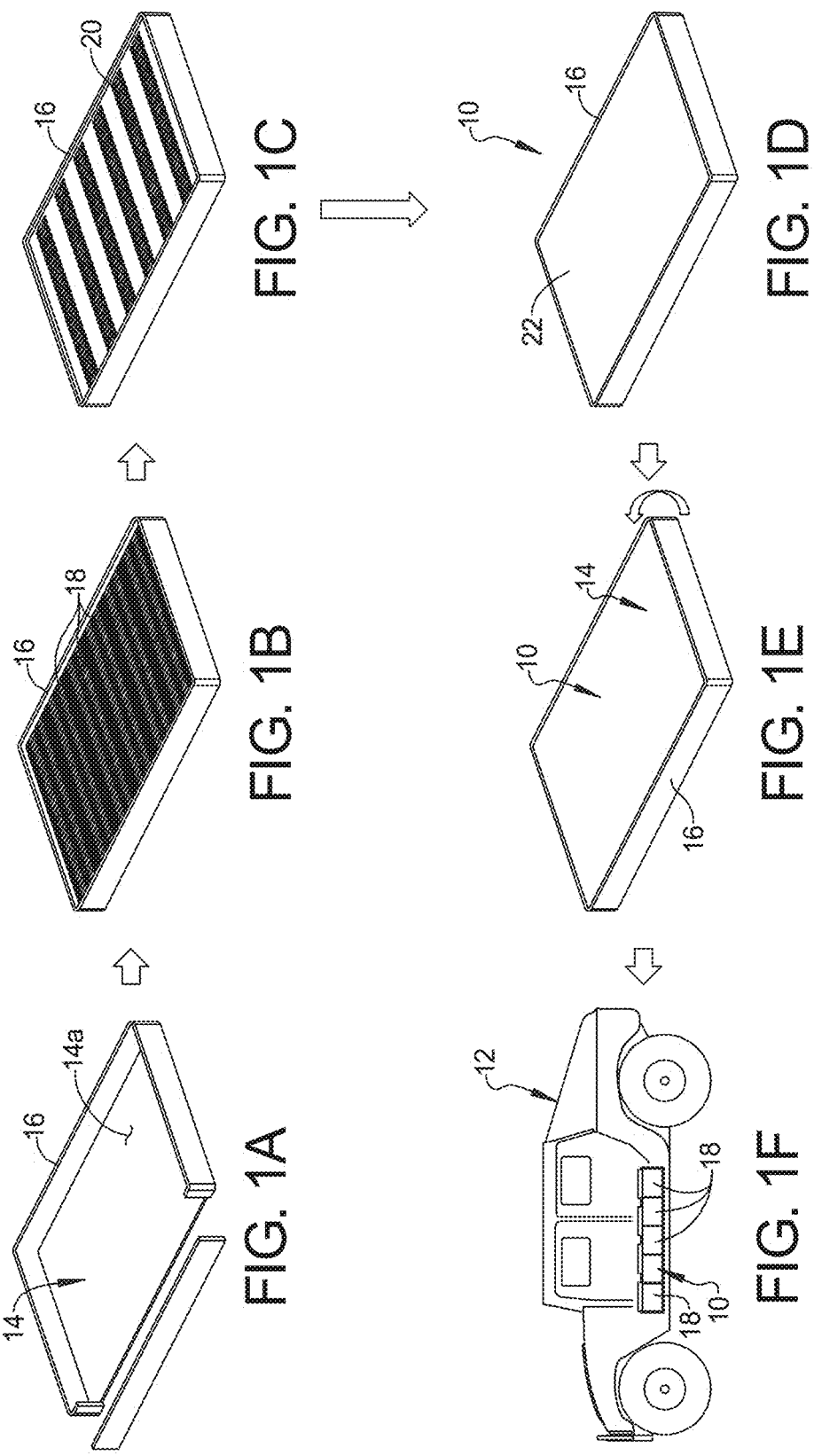

INVERTED BATTERY PACK ASSEMBLY

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to an inverted battery pack assembly for an electric vehicle.

The rechargeable energy storage system of an electric vehicle contains several hundreds of battery cells weighing from 1000 pounds for electric cars to almost 3000 pounds for electric trucks/SUVs. While the entire battery pack is mounted to the vehicle floor structure, the large weight and corresponding loads of these battery cells are sustained by the load-bearing components in the rechargeable energy storage system structure. Typical engineering solutions to endure such loads include hanging the batteries or modules onto the stiff cross beams and/or bolting the modules down to the bottom shear plate. Both approaches impose dimensional or structural limitations inhibiting design optimization. Each battery module contains a plurality of battery cells.

SUMMARY

The present disclosure provides a novel inverted battery pack design and assembly sequence to join the bottom of the battery cells to the top shear plate. This design heavily engages the top rechargeable energy storage system structure to evenly distribute the battery cell weights, opening design space for cross beams and bottom shear plate and improving the serviceability of the rechargeable energy storage system.

According to an aspect of the present disclosure, a rechargeable energy storage system for a vehicle includes a bottom shear plate and a side enclosure having a bottom end connected to the bottom shear plate. A top shear plate is connected to a top end of the side enclosure and a plurality of battery cells are suspended from a bottom of the top shear plate by corresponding mating features that secure the plurality of cells to the top shear plate.

According to a further aspect, the top shear plate is a vehicle floor panel.

According to a further aspect, the corresponding mating features include a threaded protrusion on one of the plurality of battery cells and the shear plate and a threaded aperture on the other of the plurality of battery cells and the shear plate.

According to a further aspect, the corresponding mating features include a protruding portion on the plurality of battery cells and an aperture on the shear plate wherein one of the protruding portion and the aperture includes an elastic retention feature.

According to a further aspect, the elastic retention feature includes a pair of rails that engage a recess in the protruding portion.

According to a further aspect, the corresponding mating features include a flange on the plurality of battery cells and a slot on the shear plate for receiving the flange of the plurality of battery cells.

According to a further aspect, the plurality of battery cells have electrode terminals and venting that face the bottom shear plate.

According to another aspect of the present disclosure, an electric vehicle, includes a vehicle body supported by a plurality of wheels and a rechargeable energy storage system underneath the vehicle body. The rechargeable energy storage system includes a bottom shear plate. A side enclosure includes a bottom end connected to the bottom shear plate. a top shear plate connected to a top end of the side enclosure. A plurality of battery cells are suspended from a bottom of the top shear plate by corresponding mating features that secure the plurality of battery cells to the top shear plate.

According to another aspect of the present disclosure, a method of assembling a rechargeable energy storage system into a vehicle includes connecting a side enclosure to a first shear plate. A mating feature of a plurality of battery cells are connected to a corresponding mating feature of the first shear plate and a second shear plate is connected to the side enclosure to form an enclosed housing. The enclosed housing is inverted so that the second shear plate is on a bottom of the battery housing and the plurality of battery cells are suspended from a bottom of the first shear plate. The battery housing is then assembled into a vehicle body.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A illustrates an assembly of an side enclosure to a top shear plate of a rechargeable energy storage system according to the principles of the present disclosure;

FIG. 1B illustrates an assembly of battery cells to a top shear plate of an energy storage system according to the principles of the present disclosure;

FIG. 1C illustrates a face plate installed battery cells according to the principles of the present disclosure;

FIG. 1D illustrates the assembly of a bottom shear plate of the rechargeable energy storage system according to the principles of the present disclosure;

FIG. 1E illustrates the inversion of the rechargeable energy storage system according to the principles of the present disclosure;

FIG. 1F illustrates the inverted rechargeable energy storage system in a vehicle according to the principles of the present disclosure;

In the drawings, reference numbers may be reused to identify similar and/or identical elements.

DETAILED DESCRIPTION

Figure 2A:
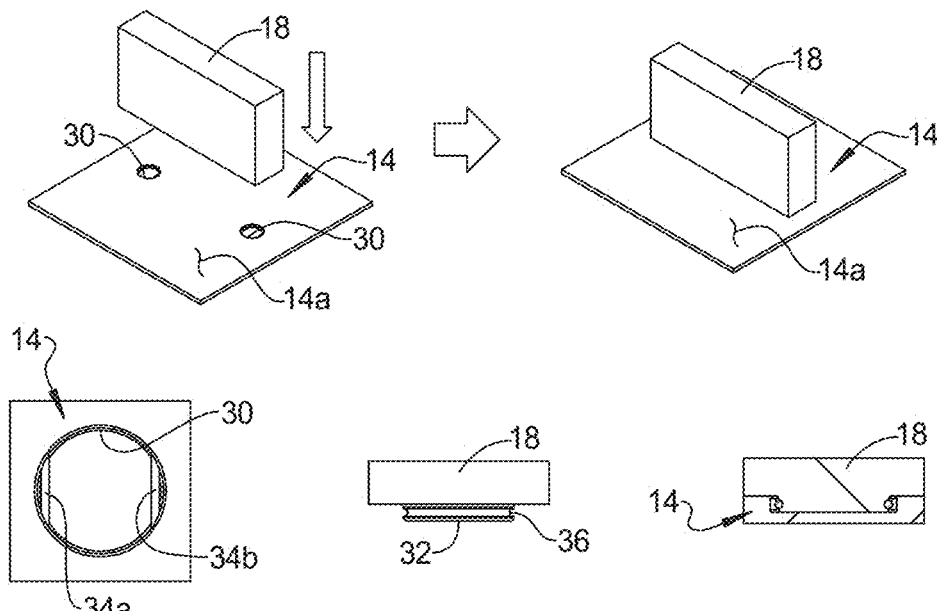
FIG. 2A illustrates a press-in mating feature for mounting the battery cells to the top shear plate according to the principles of the present disclosure.

With reference to FIGS. 1A-1E, a process for assembling an inverted rechargeable energy storage system 10 for a vehicle 12 will be described. As shown in FIG. 1A, a top shear plate 14 of the rechargeable energy storage system 10 is located bottom face up and a side enclosure 16 is mounted to a bottom surface 14*a* of the top shear plate 14. The side enclosure 16 can be fully or partially installed to the top shear plate 14. As shown in FIG. 1B, a plurality of battery cells 18 are mounted to the bottom surface 14*a* of the top shear plate 14 using corresponding mating features. As shown in FIG. 1C, a face plate 20 is mounted to the installed battery cells 18. The face plate 20 can include a bus for connecting to terminals on the plurality of battery cells. The face plate 20 can be a continuous plate or a meshed plate. It is connected to the side enclosure for protecting batteries from falling off from the top shear plate during service. As shown in FIG. 1D, a bottom shear plate 22 is secured to the side enclosure 16 to form a sealed enclosed rechargeable energy storage system 10. As shown in FIG. 1E, the rechargeable energy storage system is inverted so that the battery cells 18 are suspended from the bottom surface of the top shear plate 14. As shown in FIG. 1F, the inverted rechargeable energy storage system 10 is installed in a vehicle 12 by mounting the rechargeable energy storage system to the body or frame of the vehicle 12. The top shear plate 14 can optionally serve as a floor panel of the vehicle 12 passenger compartment.

With reference to FIG. 2A, a first exemplary press-in mating feature 30, 32 is shown for mounting the battery cells 18 to the top shear plate 14 according to the principles of the present disclosure. In particular, the shear plate 14 includes a plurality of openings 30 that can include elastic features 34 such as spring biased rails 34*a*, 34*b* on opposite sides of the openings 30. The plurality of battery cells 18 further include one or more protruding features 32 that can define a rim with a recess region 36 that can received the spring biased rails 34*a*, 34*b* to retain the protruding feature 32 within the openings 30. It is noted that the elastic features 34 can take on alternative forms to releasably engage the protruding features 32.

Figure 2B:
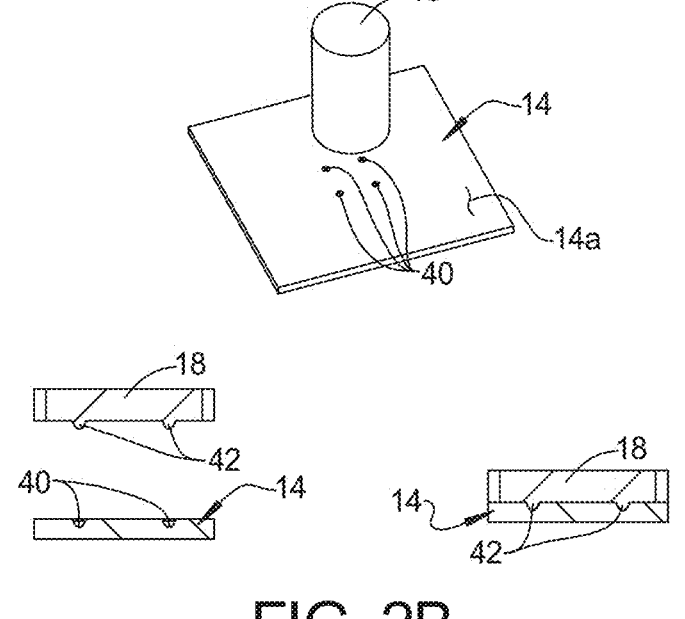
FIG. 2B illustrates an alternative press-in mating feature for mounting the battery cells to the top shear plate according to the principles of the present disclosure.

With reference to FIG. 2B, a second exemplary press-in mating feature 40, 42 is shown for mounting the battery cells 18 to the top shear plate 14 according to the principles of the present disclosure. In particular, the shear plate 14 includes a plurality of openings 40 that can include a rib 44. The plurality of battery cells 18 further include one or more protruding features 42 that can define a flexible flange 46 that can be inserted past the rib 44 and expands to retain the protruding feature 42 within the openings 40. It is noted that the flexible flange 46 can take on alternative forms to releasably engage the protruding features 42.

Figure 2C:
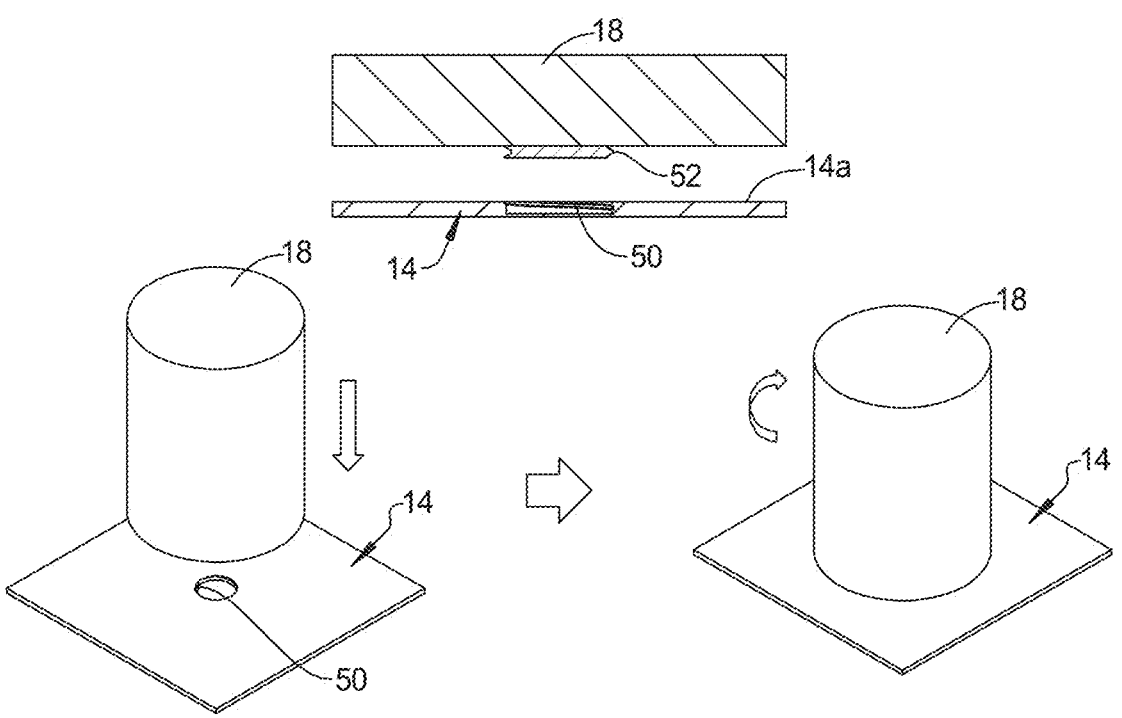
FIG. 2C illustrates a screw-in mating feature for mounting the battery cells to the top shear plate according to the principles of the present disclosure.

With reference to FIG. 2C, a third exemplary screw-in mating feature 50, 52 is shown for mounting the battery cells 18 to the top shear plate 14 according to the principles of the present disclosure. In particular, the shear plate 14 includes a plurality of openings 50 that can include a threaded or bayonet surface. The plurality of battery cells 18 further include one or more protruding features 52 that can define a threaded or bayonet surface that can be rotatably engaged with the threaded or bayonet surface to retain the protruding feature 52 within the openings 50.

Figure 2D:
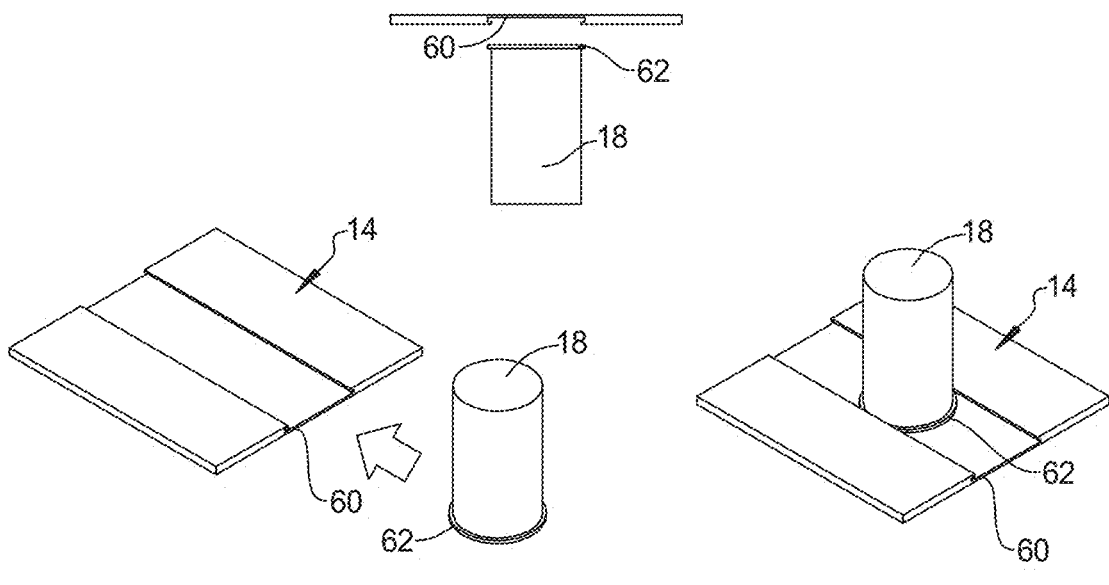
FIG. 2D illustrates a slide-in mating feature for mounting the battery cells to the top shear plate according to the principles of the present disclosure.

With reference to FIG. 2D, a third exemplary slide-in mating feature 60, 62 is shown for mounting the battery cells 18 to the top shear plate 14 according to the principles of the present disclosure. In particular, the shear plate 14 includes a plurality of slots 60 that can include a pair of ribs. The plurality of battery cells 18 further include a flange 62 that can be slidably received in the to retain the battery cells 18 to the top shear plate 14.

Figure 3:
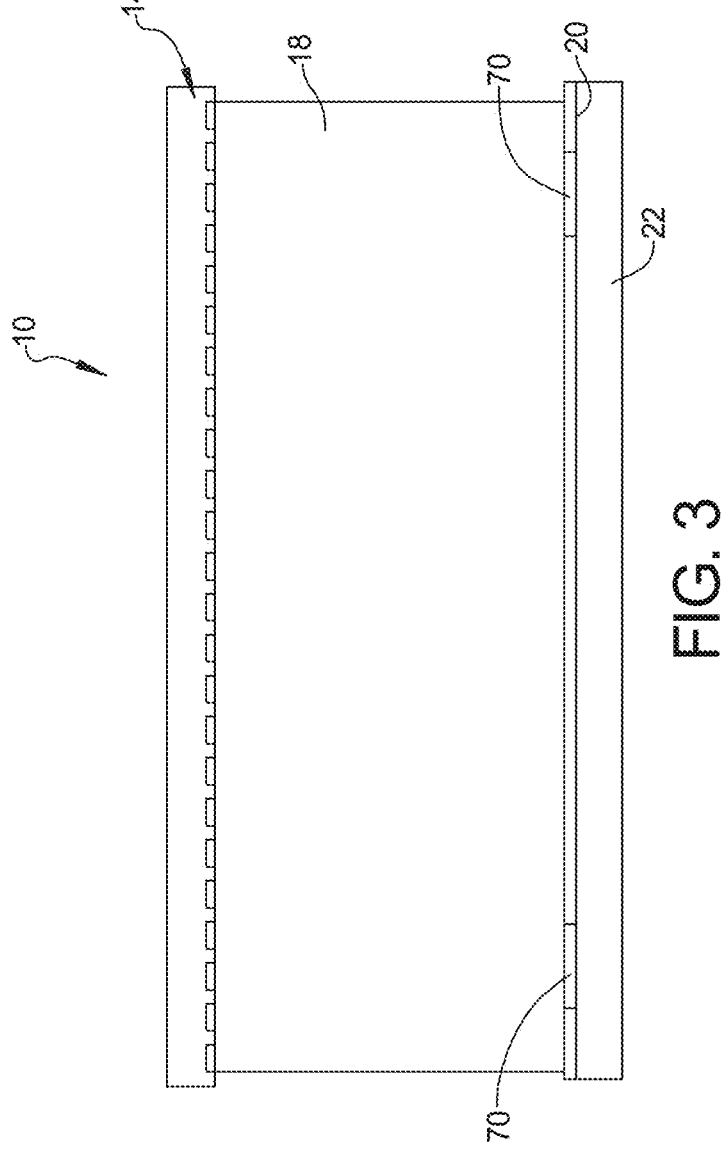
FIG. 3 is a schematic cross section view of the rechargeable energy storage system.

FIG. 3 is a schematic partial cross-section view of the rechargeable energy storage system 10 showing the battery cell 18 suspended below the top shear plate 14 with its electrode tabs 70 engaging the face plate 20. The bottom shear plate 22 encloses the rechargeable energy storage system 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, cells, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A rechargeable energy storage system for a vehicle, comprising:

a bottom shear plate;

a side enclosure having a bottom end connected to the bottom shear plate;

a top shear plate connected to a top end of the side enclosure; and a plurality of battery cells are suspended directly from a bottom of the top shear plate by corresponding mating features that secure the plurality of cells to the top shear plate, the corresponding mating features including a plurality of first mating features formed directly on the shear plate for receiving a plurality of second mating features formed directly on the plurality of battery cells, wherein the plurality of first mating features include one of:

i) a threaded protrusion on the plurality of battery cells, ii) a protruding portion on the plurality of battery cells, and iii) a flange on the plurality of battery cells;

and the plurality of second mating features include a corresponding one of:

i) a plurality of threaded apertures on the shear plate for receiving a respective one of the threaded protrusions on the plurality of battery cells, ii) a plurality of apertures on the shear plate wherein the plurality of apertures include an elastic retention feature wherein the apertures include an elastic retention feature for engaging a respective one of the protruding portions on the plurality of battery cells, and iii) a plurality of slots on the shear plate for receiving a respective one of the flanges of the plurality of battery cells.

2. The rechargeable energy storage system according to claim 1, wherein the top shear plate is a vehicle floor panel.

3. The rechargeable energy storage system according to claim 1, wherein the elastic retention feature includes a pair of rails that engage a recess in the protruding portion.

4. The rechargeable energy storage system according to claim 1, wherein the plurality of battery cells have electrode terminals that face the bottom shear plate.

5. An electric vehicle, comprising:

a vehicle body supporting a plurality of wheels a rechargeable energy storage system supported by the vehicle body and including:

a bottom shear plate;

a side enclosure having a bottom end connected to the bottom shear plate;

a top shear plate connected to a top end of the side enclosure;

a plurality of battery cells are suspended directly from a bottom of the top shear plate by corresponding mating features that secure the plurality of battery cells to the top shear plate, the corresponding mating features including a plurality of first mating features formed directly on the shear plate for receiving a plurality of second mating features formed directly on the plurality of battery cells, wherein the plurality of first mating features include one of:

i) a threaded protrusion on the plurality of battery cells, ii) a protruding portion on the plurality of battery cells, and iii) a flange on the plurality of battery cells;

and the plurality of second mating features include a corresponding one of:

i) a plurality of threaded apertures on the shear plate for receiving a respective one of the threaded protrusions on the plurality of battery cells, ii) a plurality of apertures on the shear plate wherein the plurality of apertures include an elastic retention feature wherein the apertures include an elastic retention feature for engaging a respective one of the protruding portions on the plurality of battery cells, and iii) a plurality of slots on the shear plate for receiving a respective one of the flanges of the plurality of battery cells; and one of a meshed or continuous face plate directly beneath the plurality of battery cells and connected to the side enclosure.

6. The electric vehicle according to claim 5, wherein the top shear plate is a vehicle floor panel.

7. The electric vehicle according to claim 5, wherein the elastic retention feature includes a pair of rails that engage a recess in the protruding portion.

8. The electric vehicle according to claim 5, wherein the plurality of battery cells have electrode terminals and venting that face the bottom shear plate.

9. A method of assembling a rechargeable energy storage system into a vehicle, comprising:

connecting a side enclosure to a first shear plate;

connecting a first mating feature of a plurality of battery cells to a corresponding one of a plurality of second mating features directly on the first shear plate;

connecting a second shear plate to the side enclosure to form an enclosed housing;

inverting the enclosed housing so that the second shear plate is on a bottom of the enclosed housing and the plurality of battery cells are suspended from a bottom of the first shear plate; and assembling the battery housing into a vehicle body.

10. The method of assembling a rechargeable energy storage system according to claim 9, wherein the first shear plate is a floor panel of the vehicle.

11. The method of assembling a rechargeable energy storage system according to claim 9, wherein the first mating features include a threaded protrusion on the plurality of battery cells and the plurality of second mating features include a plurality of threaded apertures on the shear plate.

12. The method of assembling a rechargeable energy storage system according to claim 9, wherein the first mating features include a protruding portion on each of the plurality of battery cells and the plurality of second mating features include a plurality of apertures on the shear plate wherein one of the protruding portions and the apertures include an elastic retention feature.

13. The method of assembling a rechargeable energy storage system according to claim 9, wherein the first mating features include a flange on the plurality of battery cells and the plurality of second mating features include a plurality of slots on the shear plate for receiving the flange of the plurality of battery cells.

14. The method of assembling a rechargeable energy storage system according to claim 9, wherein the plurality of battery cells have electrode terminals that face the second shear plate.

* * * * *